(12) United States Patent
Lee (10) Patent No.: US 9,149,755 B2
(45) Date of Patent: Oct. 6, 2015

(54) WET TYPE DUST COLLECTOR FOR AIR PURIFYING

(71) Applicant: Seong Hun Lee, Gyeongsangnam-do (KR)

(72) Inventor: Seong Hun Lee, Gyeongsangnam-do (KR)

(*) Notice: Subject to any disclaimer, the term of this patent is extended or adjusted under 35 U.S.C. 154(b) by 15 days.

(21) Appl. No.: 14/307,060

(22) Filed: Jun. 17, 2014

(65) Prior Publication Data

US 2015/0004064 A1    Jan. 1, 2015

(30) Foreign Application Priority Data

Jun. 27, 2013 (KR) .................. 10-2013-0074112

(51) Int. Cl.
| | | |
|---|---|---|
| *B01D 47/00* | (2006.01) | |
| *B01D 50/00* | (2006.01) | |
| *B01D 47/06* | (2006.01) | |
| *B01D 46/00* | (2006.01) | |

(52) U.S. Cl.
CPC .......... *B01D 50/006* (2013.01); *B01D 46/0028* (2013.01); *B01D 47/06* (2013.01)

(58) Field of Classification Search
CPC ............. A61L 9/00; A61L 9/14; A61L 9/145; B01D 46/00; B05B 17/00
USPC .......... 422/1, 311, 900; 96/227, 234, 242–243
See application file for complete search history.

(56) References Cited

U.S. PATENT DOCUMENTS 5,771,473 A * 6/1998 Yu .............................. G21F 9/02
110/345

* cited by examiner

*Primary Examiner* — Monzer R Chorbaji
(74) *Attorney, Agent, or Firm* — Heidi L. Eisenhut; Loza & Loza, LLP (57) ABSTRACT

A wet type dust collector for air purifying according to an embodiment of the present invention can efficiently cool polluted air and remove sludge because it is designed to be able to continuously cool polluted air from the outside with cooling water, which is cooled and circulated, and to remove sludge and foreign substances.

18 Claims, 9 Drawing Sheets

WET TYPE DUST COLLECTOR FOR AIR PURIFYING

CROSS-REFERENCE TO RELATED APPLICATIONS

This application claims under 35 U.S.C. §119 to Korean Patent Application No. 10-2013-0074112, filed Jun. 27, 2013, which is hereby incorporated by reference.

BACKGROUND OF THE INVENTION

1. Field of the Invention

The present invention relates to a wet type dust collector for air purifying.

2. Description of the Related Art

In general, a dust collector is a device that separates and collects dust and mist from a process gas. The dust collector includes pre-processing and accessory equipment for the function. Further, the dust collector is divided into various types such as a gravity dust collector, an inertial dust collector, a centrifugal dust collector, sonic dust collector, a scrubbing dust collector, a filter dust collector, and an electric dust collector in accordance with the effective force for collecting dust, such as gravity, inertia force, centrifugal force, attractive force, hydrophilic force, and electric force which are applied to particles. In those dust collectors, one with a function of removing the collected dust with water or other liquid is called a wet type dust collector.

A wet type dust collector, one of those dust collectors, which has an improved purifying function for primarily removing dust by spraying small waterdrops, secondarily removing the remaining dust by supplying water again, and finally completely removing the dust through a multistep filter has been disclosed in Korean Patent Publication NO. 10-2012-0013771.

A dust collector that includes fabric filter which receives air inside, has a filtering unit that filters inflow air, and discharges the air through the filtering unit, and an ammonia sprayer which sprays ammonia to the air flowing into the fabric filter, and that can simultaneously process dust and fine particles in burned air and sulfur oxides by changing them into ammonium sulfate and filter them with the filtering unit has been disclosed in Korean Patent Publication No. 10-2011-0108971.

Such a wet type dust collector has a problem in that it cannot efficiently cool polluted gases or air at a high temperature.

Further, there is a problem in that water or liquid sprayed for removing pollutants cannot efficiently remove the pollutants.

SUMMARY OF THE INVENTION

The present invention has been made in an effort to provide a wet type dust collector for air purifying which can efficiently cool polluted-air and remove sludge because it is designed to be able to continuously cool polluted-air from the outside with cooling water, which is cooled and circulated, and to remove sludge and foreign substances.

An aspect of the present invention provides a wet type dust collector for air purifying which includes: a case that forms the outer shape of a collector and receives cooling water; a cooler that cools cooling water that is guided by a cooling pipe connected with the case; a blower that is disposed outside the blower and forcible takes and sends polluted-air inside; a blower pipe that is connected with an outlet of the blower and guides the sent polluted-air into the case; a spray nozzle that is connected with the cooling pipe, disposed in the blower pipe, and sprays cooling water to the polluted-air flowing in the blower pipe; an air spray unit that is connected to the lower end of the blower pipe and distributes the polluted-air discharged through the blower pipe to be discharged in contact with the surface of the cooling water; an auxiliary cooling assembly that is disposed over the air spray unit, has a porous structure forming a cooling water film with the cooling water sprayed from the outside, and cools again the polluted-air moving upward; a filter assembly that is disposed over the auxiliary cooling assembly and filters foreign substances and sludge in the polluted-air; and an air discharge port that is disposed over the case and forms a passage through which the polluted-air passing through the filter assembly is discharged to the outside.

A plurality of photo-catalytic purifying units is disposed in the air discharge port to sterilize and deodorize the polluted-air, using a photo-catalytic reaction.

An air purifying unit including a plurality of photo-catalytic purifying units for sterilizing and deodorizing the polluted-air, using a photo-catalytic reaction, communicates with the air discharge port outside the case.

The photo-catalytic purifying units are sequentially arranged with regular intervals and the polluted-air sequentially passes through the photo-catalytic purifying units.

The photo-catalytic purifying unit includes: photo-catalytic plates formed by coating a copper plate with titanium dioxide and having air holes through which air passes and guides that are bent at an angle at one end of the air holes and guides the air passing through the air holes; and ultraviolet lamps disposed on one side of the photo-catalytic plates.

The guides are arranged to cross each other on adjacent photo-catalytic plates so that the flow path of air is elongated, in the photo-catalytic purifying units sequentially arranged.

The air purifying unit includes a purifying unit case being in contact with the case and a separation plate dividing the inside of the purifying unit case into a plurality of spaces to form channels for polluted-air, and a plurality of photo-catalytic purifying units are arranged with regular intervals in the divided spaces.

A vortex plate that is formed in the shape of an inclined plate and that polluted-air flowing upward hits against and goes around is disposed between the air spray unit and the auxiliary cooling assembly.

The vortex plate includes a first vortex plate mounted around the inner side of the case and inclined toward the inside and a second vortex plate fitted on the blower pipe over the first vortex plate and inclined outward to cross the first vortex plate.

The air spray unit has a connecting portion connected with the blower pipe, branches extending laterally from the connecting portion, and a spraying portion communicating with the ends of the branches, formed around the inner side of the case, and having a plurality of outlets at the bottom through which polluted-air is discharged.

A guide plate that is inclined under the spraying portion and that the polluted-air discharged from the outlets hits against.

The air spray unit has bending portions extending outward at an angle from the end of the blower pipe, guides disposed in the bending portions at a predetermined distance from the bending portions, and bottoms that are disposed horizontally under the guide and that the polluted-air discharged to the channels formed by the bending portions and the guides hits against.

A water supply valve that supplies water from the outside of the case and a cooling discharge valve that discharges stored cooling water are disposed in the case so that the cooling water can maintain a predetermined level being in contact with the air spray unit.

A heater for heating cooling water is disposed at the lower portion of the case and cooling water supplied through the cooling pipe is cooled by a refrigeration cycle of the cooler and maintained at a predetermined temperature.

Ozone lamps that sterilize the cooling water are disposed under the case.

The bottom of the case receiving the cooling water is inclined and a sludge discharge valve for discharging sludge sinking in the cooling water is disposed at the lower end of the case.

The following effects can be expected from the wet type dust collector for air purifying according to an embodiment of the present invention.

According to the wet type dust collector for air purifying of an embodiment of the present invention, since polluted-air is cooled by spraying cooling water cooled and circulated by a cooler into the blower pipe supplying the polluted-air into the collector, the cooled polluted-air is secondarily cooled with sludge removed by being discharged to the top of the cooling water in the collector, cooled again with sludge removed through the auxiliary cooling assembly while moving up, and then discharged.

Accordingly, since the polluted-air taken inside at a high temperature sequentially comes in contact with the cooling water several times, the temperature can be decreased. Further, since foreign substances or sludge in the polluted-air adheres to the cooling water, they can be effectively separated.

In the air spray unit at the end of the blower pipe, the spraying portion for discharging air is in contact with or close to the surface of the cooling water, such that the discharged air hits against the surface of the cooling water and foreign substances or sludge can be more effectively removed.

While the air flows upward, it hits against and goes around the first vortex plate and the second vortex plate, such that sufficient time for cooling is obtained and foreign substances or sludge can drop by hitting.

Since air passes through the water film by the auxiliary cooling assembly, the polluted-air can be additionally cooled and foreign substances can be removed. Further, foreign substances can be completely removed while the air passes through the filter assembly over the auxiliary cooling assembly.

Since the photo-catalytic purifying unit that can purify polluted-air by sterilizing and deodorizing the polluted—air, using a photo-catalytic reaction, can be disposed inside and outside the collector, the air discharged through the collector can decrease in temperature for a reaction by coming in contact with the cooling water several times in various ways and foreign substances and sludge that may adhere to the photo-catalytic plates are effectively removed. Accordingly, it is easy to manage the photo-catalytic purifying unit and more effectively purify the polluted-air using a photo-catalytic reaction.

DETAILED DESCRIPTION OF THE PREFERRED EMBODIMENTS

Wet type dust collectors for air purifying according to embodiments of the present invention are described hereafter in detail with reference to the drawings.

Although the intake air is limited to polluted-air in the embodiments of the present invention, its meaning includes vapor with pollutants or polluted-air with moisture and they are generally referred to as polluted-air in the following description for the convenience of description.

Figure 1:
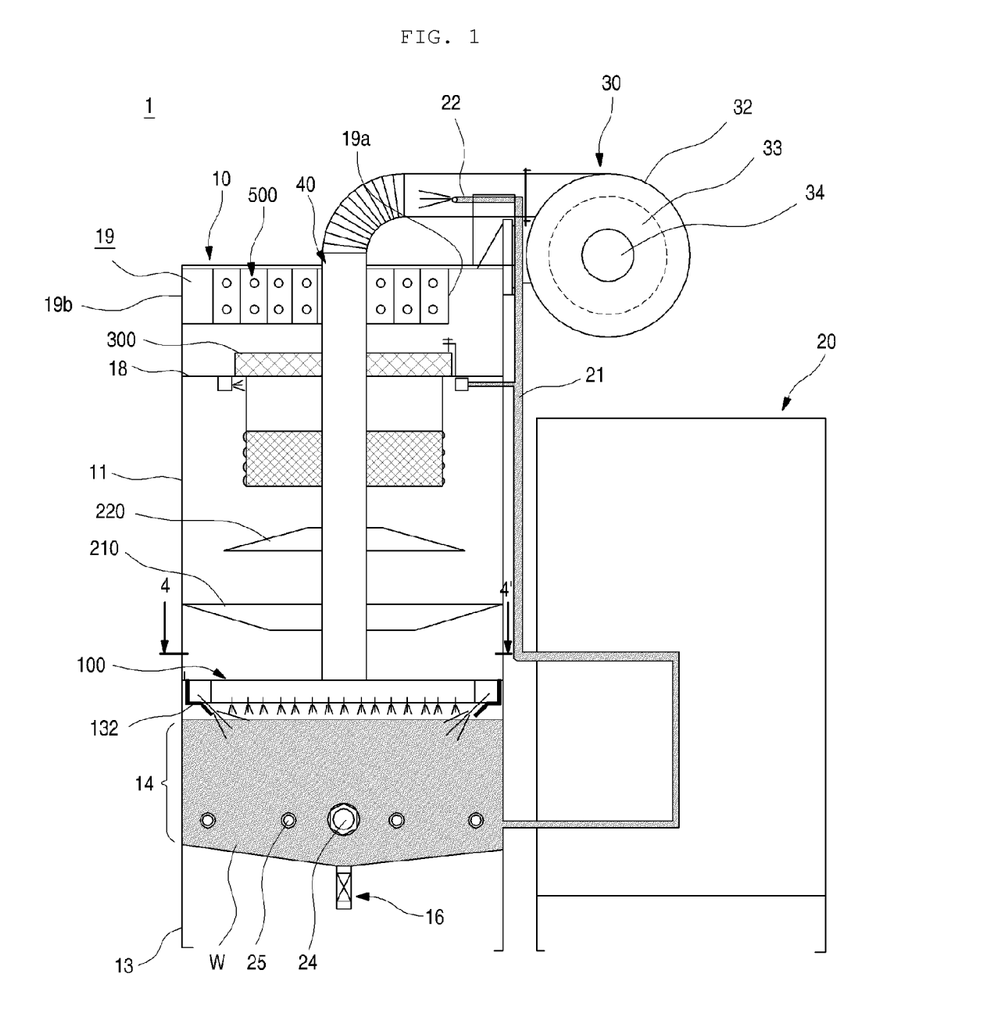
FIG. 1 is a front view illustrating the inside of a wet type dust collector for air purifying according to an embodiment of the present invention.
Figure 2:
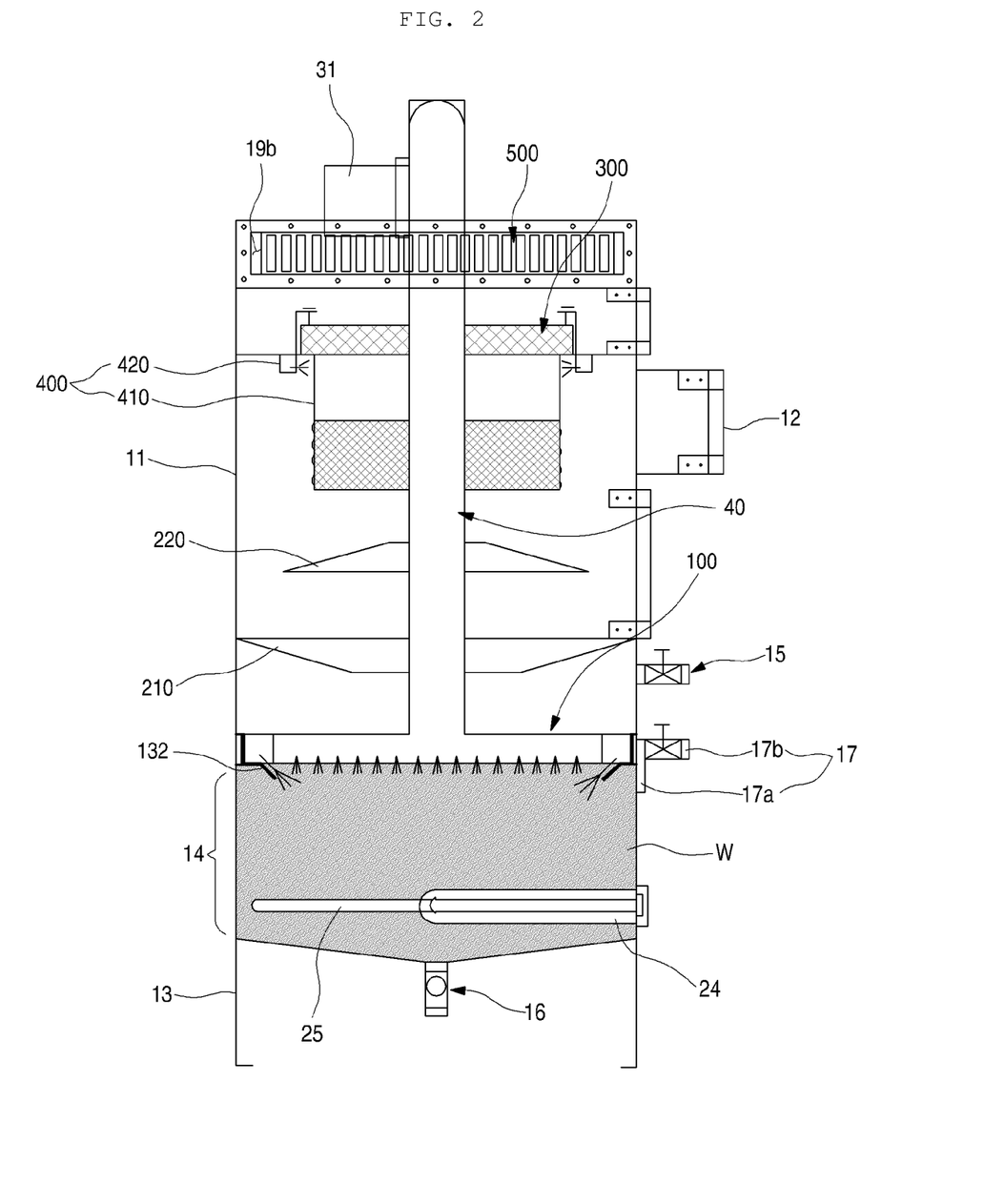
FIG. 2 is a side view illustrating the inside of the wet type dust collector for air purifying.
Figure 3:
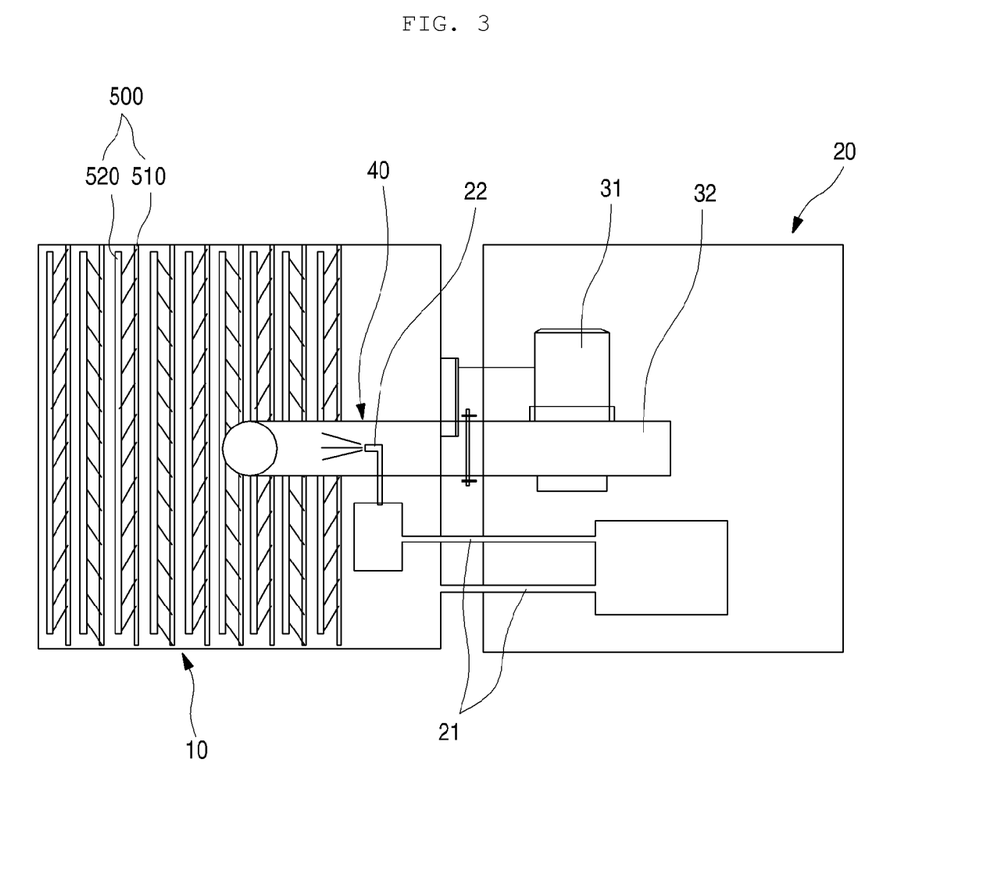
FIG. 3 is a plan view illustrating the inside of the wet type dust collector for air purifying.

FIG. 1 is a front view illustrating the inside of a wet type dust collector for air purifying according to an embodiment of the present invention. FIG. 2 is a side view illustrating the inside of the wet type dust collector for air purifying. FIG. 3 is a plan view illustrating the inside of the wet type dust collector for air purifying.

Referring to FIGS. 1 to 3, a wet type dust collector for air purifying according to an embodiment of the present invention main include a collector 10 that forcibly sucks polluted-air and discharging it after collecting and purifying it and a cooler 20 that is connected with the collector 10 and continuously supplies cooling water W to the collector 10.

The collector 10 and the cooler 20 may be integrally or separately formed. Though not illustrated in detail, a compressor, a condenser, an evaporator, and an expansion device, which make a common refrigeration cycle, may be disposed in the cooler 20.

The cooler 20 may be equipped with a cooling pipe 21. The cooling pipe 21 is connected with a cooling water storage 14 to be described below and circulates the cooling water W in order to cool air for purifying and collecting dust in a multistage type by cooling the cooling water in the cooling water storage 14 and then supplying it into a case 11.

The collector 10 includes the case 11 forming the outer shape, a blower 30 sending polluted-air into the case 11, and a blower pipe 40 guiding the polluted-air into the blower 30.

The case 11, which forms the outer shape of the collector 10, may be formed in the shape of a box with a space therein. Accordingly, an internal space where the parts for purifying polluted-air and collecting dust can be received is provided.

A controller 12 that controls the collector 10 and the cooler 20 may be disposed on the outer side of the case 11 and legs 13 extend downward from the bottom of the case 11 so that the collector 10 can be mounted. Further, a plurality of valves may be disposed on the bottom and the sides of the case 11.

The blower 30 may be composed of a fan motor 31, a shroud 32 forming the outer shape, and a blower fan 33 disposed inside the shroud 32 and is disposed at the upper portion outside the collector 10. An intake 34 is formed in the blower fan 33 so that polluted-air can be forcible taken inside when the blower fan 33 operates. Further, if necessary, other parts for taking polluted-air inside may be provided in the intake 34.

The polluted-air taken inside by the blower fan, which is oil mist, vapor, fine particles, and stinking gases generated by a garbage disposer, a waste disposer, a liquid livestock manure fermenter, other fermenters, and factories etc., is forcibly taken inside and discharged into the case 11 by the blower fan 30.

The blower pipe 40 is connected to the outlet of the shroud 32. The blower pipe 40 extends from a side of the case 11 to the center of the top of the case 11, bends downward from the center of the top of the case 11, and then extends inside the case 11. The blower pipe 40 can extend close to a predetermined level of the cooling water W in the case 11.

A first spray nozzle 22 is disposed in the blower pipe 40 which is exposed over the case 11. The first spray nozzle 22 is mounted on the end of a cooling pipe 21 through which the cooling water W is supplied such that it can spray the cooling water W toward the polluted-air flowing in the blower pipe 40.

The first spray nozzle 22 is disposed close to the outlet of the shroud 32 so that the polluted-air forcibly discharged from the blower fan 30 can be cooled upon flowing in the blower pipe 40. Accordingly, the polluted-air flowing in the case 11 is primarily cooled by the cooling water discharged from the first spray nozzle 22 and then keeps flowing into the case 11.

An air spray unit 100 is disposed under the blower 30. The air spray unit 100 allows the polluted-air cooled through the blower 30 to be discharged toward the top of the cooling water W in the case 11.

Figure 4:
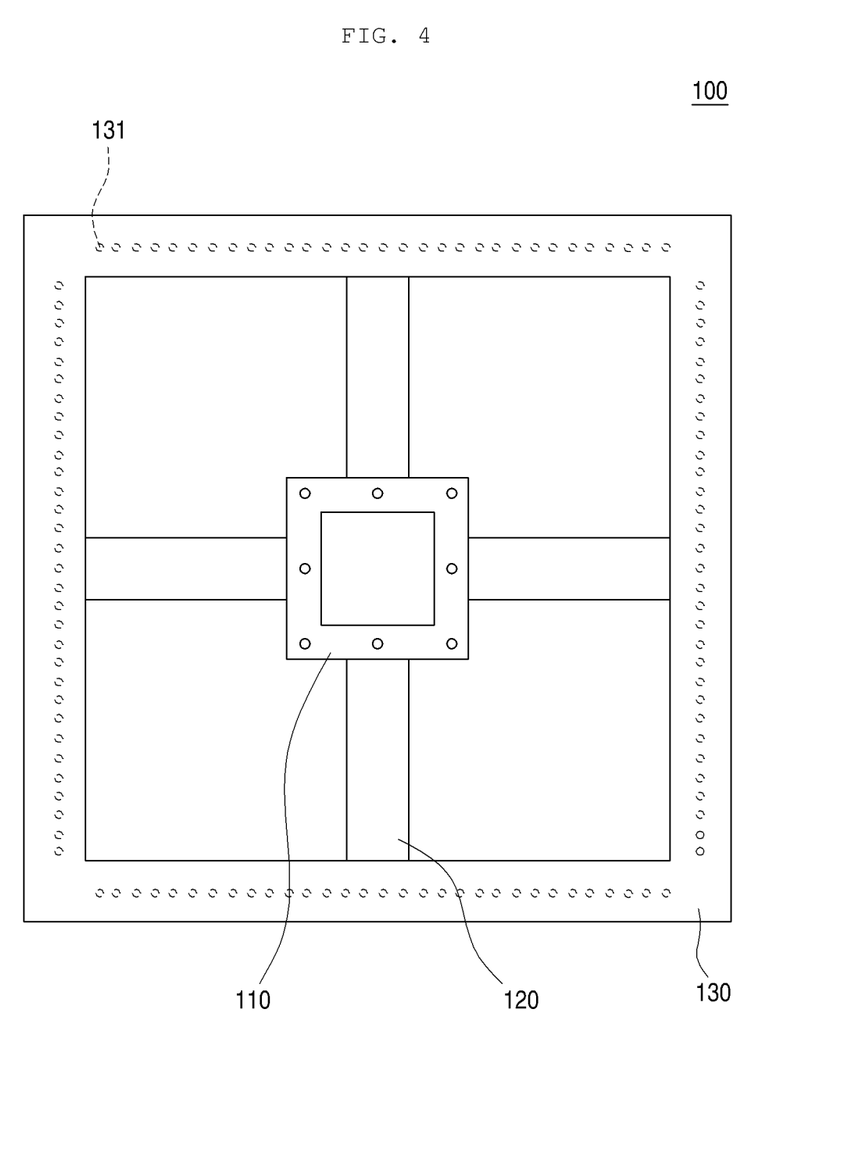
FIG. 4 is a cross-sectional view taken along line 4-4' of FIG. 1.

FIG. 4 is a cross-sectional view taken along line 4-4' of FIG. 1 and illustrates the air spray unit 100 seen from above.

The air spray unit 100 is described in detail with reference to FIG. 4. The air spray unit 100, as illustrated in FIG. 4, may include a connecting portion 110 connected with the blower 30, branches 120 extending outward from the connecting portion 110, and a spraying portion 130 disposed along the inner side of the case 11 and connected with the branches 120.

The connecting portion 110 is disposed at the center of the air spray unit 100 and may be formed in the shape of a pipe connected with the lower end of the blower pipe 40. The branches 120 are connected to the sides of the air spray unit 100.

A plurality of branches 120 may be provided, and when the cross-sections of the connecting portion 110 and the case 11 are rectangles, total four branches, one for each side, may be provided. The branches 120 extend to connect the connecting portion 110 with the spray portion 130 and may have an internal channel.

The spray portion 130 is formed along the edge of the case 11 in contact with the inner side of the case 11. The inside of the spraying portion 130 is also a channel through which fluid can flow and may communicate with the branches 120.

The bottom of the spraying portion 130 is disposed close to the top of the cooling water W in the cooling water storage 14 at the lower portion of the case 11 and a plurality of exits 131 is formed through the bottom of the spraying portion 130 so that the polluted-air can be sprayed toward the cooling water W.

A guide plate 132 extending downward at an angle is disposed on the side of the case 11 which corresponds to the bottom of the spraying portion 130. The guide plate 132 is disposed along the inner side of the case 11, that is, the spraying portion 130, such that the polluted-air discharged through the exits 131 hits against the guide plate 132 and then flows to the surface of the cooling water W. Obviously, the guide plate 132 may be disposed on the spraying portion 130, or may be integrally formed with the spraying portion 130, if necessary.

That is, thee cooled polluted-air flowing through the blower pipe 40 flows sequentially through the connecting portion 110, the branches 120, and the spraying portion 130, is discharged through the exits 131 and then sprayed toward the surface of the cooling water W after hitting against the guide plate 132.

Accordingly, the cooled polluted-air flowing through the blower pipe 40 comes in contact with the cooling water W in a larger area by the air spraying unit 100, hitting against the guide plate 132. Sludge etc. in the polluted-air can be dispersed by hitting against the guide plate 132 and the polluted-air strongly discharged toward the cooling water W is secondarily cooled by the cooling water W, the foreign substances or sludge in the polluted-air remains in the cooling water W, and only the cooled air with dust removed flows to the top of the case 11.

The cooling water storage 14, which is the lower portion of the case 11, is filled with the cooling water W close to the bottom of the air spray unit 100 and water is continuously supplied through a water supply valve 15 on a side of the case 11 so that a predetermined water level can be maintained. The water supply valve 15 may be disposed above the spraying portion 130.

The bottom of the cooling water storage 14 declines toward the center, so foreign substances or sludge sinks and collects at the center portion. A sludge discharge valve 16 is disposed at the center of the cooling water storage 14, such that the sludge and foreign substances sinking in the cooling water storage 14 can be discharged.

A heater 24 may be disposed in the cooling water storage 14. The heater 24 prevents the cooling water W from freezing in the winter season with low external temperature. Accordingly, when the cooling water W drops in temperature under a predetermined level, the heater 24 starts to operate and heats the cooling water W.

Further, an ozone lamp 25 may be disposed in the cooling water storage 14. The ozone lamp 25, which is provided for removing the stink of the cooling water W that has been contaminated by cooling and purifying the polluted-air, can remove the stink produced by the cooling water W itself by keeping operating.

Further, a cooling water discharge system 17 is disposed on a side of the case 11. The cooling water discharge system 17 keeps the cooling water W at a predetermined level in the cooling water storage 14. To this end, the cooling water discharge system 17 may be composed of an automatic water discharging/collecting tub 17a that communicates with the cooing water storage 14 and a cooling water discharge valve 17b that is connected with the automatic water discharging/collecting tub 17a and discharges the cooling water W to the outside.

The automatic water discharging/collecting tub 17a is mounted on the outer side of the case 11 to avoid interference with the spraying portion 130 and communicates with the cooling water storage 14. The cooling water discharge valve 17b is positioned at the height corresponding to the bottom of the spraying portion 130 allows the cooling water W in the cooling water storage 14 to be naturally discharged when the level is increased by inflow of oil mist, vapor, and dust etc.

That is, the cooling water W in the cooling water storage 14 can keep a predetermined level by the water supply valve 15 and the cooling water discharge valve 17b.

A first vortex plate 210 is disposed over the air spray unit 100. The vortex plate 210 is formed along the inner side of the case 11, with a predetermined width, and is fixed to the inner side of the case 11. The first vortex plate 210 is tapered downward so that the air flowing upward goes around it, such that the air flowing upward hits against the first vortex plate 210 and the sludge to remain can be separated. Further, the first vortex plate 210 is tapered downward such that the cooling water W flowing from above can smoothly flows down.

A second vortex plate 220 may be disposed over the first vortex plate 210. The second vortex plate 220 is mounted on the blower pipe 40 and tapered downward to the outside. Accordingly, the air flowing upward can go around the second vortex plate 220 again. Further, the cooling water W dropping from above can be easily guided downward.

The outer edge of the second vortex plate 220 is positioned further outside than the opening at the center of the first vortex plate 210 so that the path of the air flowing upward in the case 11 can be elongated.

A filter assembly 300 and an auxiliary cooling assembly 400 are disposed over the second vortex plate 220. The filter assembly 300 is mounted on a base plate 18 vertically dividing the inside of the case 11 so that the air flowing upward in the case 11 can filter pollutants by passing through it. The filter assembly 300 may be a single filter or may be composed of a plurality of filters overlapping each other, if necessary.

The filter assembly 300 closes the opening of the base plate 18 with the blower pipe 40 through it, such that it can filter most of pollutants in the air flowing upward in the case 11.

The auxiliary cooling assembly 400 is disposed on the bottom of the filter assembly 300. The auxiliary cooling assembly 400, which is provided to additionally cool the air flowing upward, may be composed of a cooling water grill 410 and a second spray nozzle 420 that sprays cooling water W to the cooling water film.

The cooling water grill 410 is formed in a porous structure such as a net or a lattice and extends to a predetermined position over the second vortex plate 220 from under the filter assembly 300. The cooling water grill 410 may pass through the center of the blower pipe 40 in the same or similar shape as the cross-section of the filter assembly 300.

The second spray nozzle 420 is disposed outside the cooling water grill 410. The second spray nozzle 420 is connected with the cooling pipe 21 and can spray the cooling water W to the cooling water grill 410. As the cooling water W is sprayed, the cooling water grill 410 can make a film of the cooling water W.

Accordingly, the air flowing upward in the case 11 necessarily passes through the filter assembly 300, and when the air passes the inside of the cooling water grill 410 of the auxiliary cooling assembly 400 or through the cooling water grill 410, it can be additionally cooled by the cooling water W sprayed to the cooling water grill 410. Further, the cooling water W flowing down from the cooling water grill 410 drops to the cooling water storage 14 sequentially through the first vortex plate 210 and the second vortex plate 220.

An air discharge port 19 is disposed at the uppermost position in the case 11. The air discharge port 19 is a passage through which air purified with dust removed in the case 11 is discharged, with the outlet 19b of the air discharge port 19 formed on the outer side of the case, and is connected with a pipe for discharging or an additional pipe for purifying air and discharges the air purified with dust removed. The air discharge port 19 divides the inside of the case 11 and the inlet 19a far from the outlet 19b is open, such that a sufficient channel for discharging air is formed.

A photo-catalytic purifying unit 500 may be disposed in the air discharge port 19, so the air purified through the filter assembly 300 can be purified and sterilized through the photo-catalytic purifying unit 500 of a photo-catalytic purifying type. The air discharge port 19 extends from one end to the other end of the case 11, so it provides a space where air can be effectively sterilized and purified while flowing by a photo-catalytic reaction.

Figure 5:
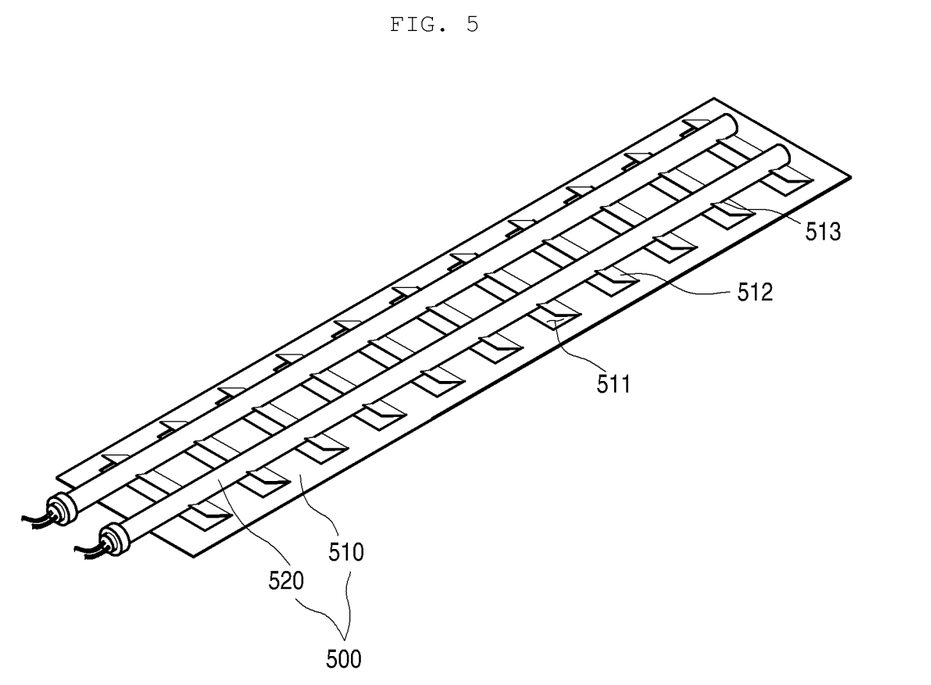
FIG. 5 is a perspective view illustrating a photo-catalytic purifying unit according to an embodiment of the present invention.
Figure 6:
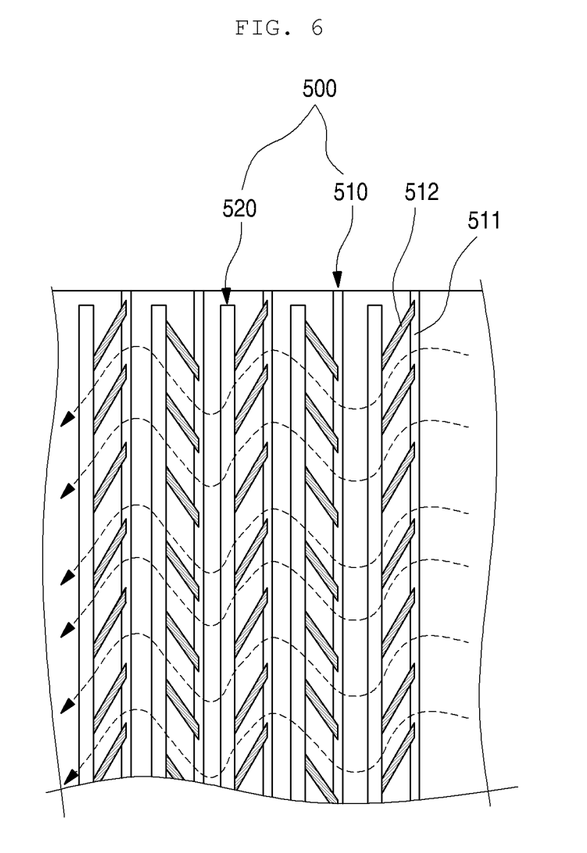
FIG. 6 is a view illustrating air flow in the photo-catalytic purifying unit.

FIG. 5 is a perspective view illustrating a photo-catalytic purifying unit according to an embodiment of the present invention. FIG. 6 is a view illustrating air flow in the photo-catalytic purifying unit.

The photo-catalytic purifying unit 500 is described in detail with reference to FIGS. 5 and 6. The photo-catalytic purifying unit 500 may be composed of a plurality of photo-catalytic plates 510 and ultraviolet lamps 520 fixed to the photo-catalytic plate 510.

The photo-catalytic plates 510 are plates that can divide the air discharge port 19 and titanium dioxide $TiO_2$ is coated on the surface of a copper (Cu) plate for a photo-catalytic reaction on the outer side of the photo-catalytic plates 510. The ultraviolet lamps 520 are disposed on the photo-catalytic plates 510 and air can be sterilized and deodorized by a photo-catalytic reaction that is generated when the ultraviolet lamps 520 radiate light. Sterilizing and deodorizing by a photo-catalytic reaction are generally known in the art and the detailed description is not provided, but the structure of the photo-catalytic purifying unit provided for a photo-catalytic reaction is described in detail in the embodiment of the present invention.

A plurality of air holes 511 is formed through the photo-catalytic plate 510. The air holes 511 are formed in a rectangular shape, and guides 512 and air holes 511 are formed by cutting rectangles on the photo-catalytic plate 510 and bending them at a predetermined angle.

Lamp seats 513 that are recessed in a corresponding shape so that the ultraviolet lamp 520 can be seated are formed at the end of the guide 512. Accordingly, the ultraviolet lamps 520 can be mounted on the photo-catalytic plates 510 without a specific fixing member.

A plurality of photo-catalytic plates 51 with the ultraviolet lamps 520 may be sequentially arranged with regular intervals in the discharge direction of the purified air.

The photo-catalytic plates 510 are arranged at an angle such that the guides 512 of the adjacent photo-catalytic plates 510 cross each other. That is, when one photo-catalytic plate 5410 has a left-down inclination, as in FIG. 6, the adjacent photo-catalytic plate 510 is arranged with a right-up inclination.

Accordingly, the air flowing inside through the inlet 19a of the air discharge port 19 flows in a zigzag pattern by changing the flow direction every time it passes the photo-catalytic plates 510, such that the flow passage of the air can be maximized, and accordingly, the efficiency of sterilizing and deodorizing by a photo-catalytic reaction can be increased.

The operation of the wet type dust collector for air purifying, which has the configuration described above, is described hereafter.

Figure 7:
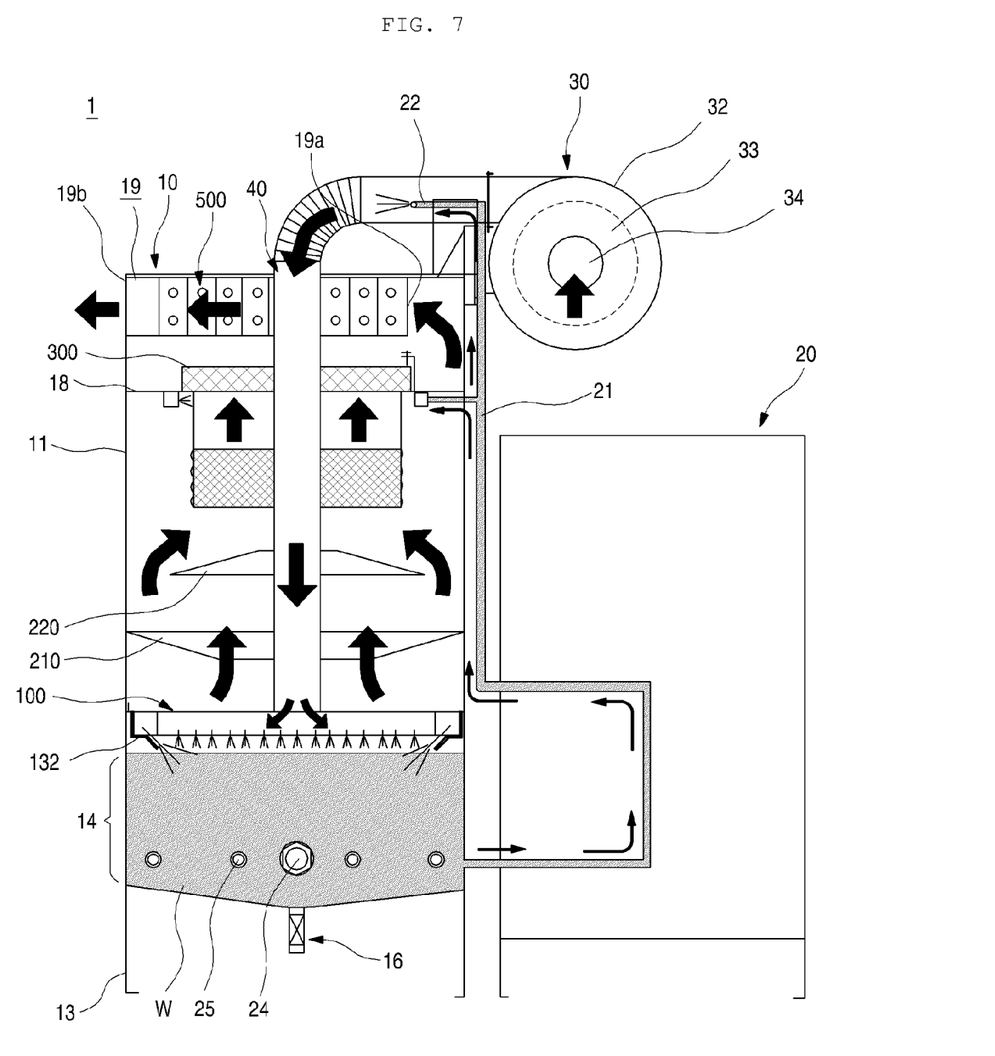
FIG. 7 is a view illustrating air flow in the wet type dust collector for air purifying.

FIG. 7 is a view illustrating air flow in the wet type dust collector for air purifying.

Referring to FIG. 7, when the wet type dust collector 1 for air purifying according to an embodiment of the present invention is installed, the cooling water storage 14 is filled with the cooling water W at a predetermined level, that is, up to or close to the bottom of the spraying portion 130. The cooling water W in the cooling water storage 14 maintained at a predetermined temperature by the cooler 20 and the heater 24.

In this state, when the wet type dust collector 1 for air purifying is operated, the blower 30 is operated and takes polluted-air inside. The polluted-air taken inside is usually a mixture of oil mist, fine particles, and stinking gas at a high temperature.

The polluted-air forcibly taken inside in this state flows into the case 11 of the collector 10 through the blower pipe 40. The first spray nozzle 22 in the blower pipe 40 sprays the cooling water W. The cooling water W sprayed from the first spray nozzle 22 is sprayed to the polluted-air flowing inside through the outlet of the blower 30, such that it primarily cools the polluted-air supplied into the case 11 and adheres to the sludge in the air, thereby making the sludge be easily separated.

The polluted-air flowing through the blower pipe 40 flows to the air spray unit 100 connected to the lower end of the blower pipe 40. The polluted-air flows to the spraying portion 130 through the connecting portion 110 and the branches 120, in the air spray unit 100. The spraying portion 130 is formed along the edge of the case 11 and sprays the polluted-air in a large area so that the polluted-air can come in contact with the cooling water.

The polluted-air discharged from the spraying portion 130 hits against the guide plate 132 and flows to the top of the cooling water in the cooling water storage 14. Accordingly, the discharged polluted-air hits against the guide plate 132 and then hits against the cooling water W again, such that the sludge in the air can be separated and the polluted-air can be cooled by the cooling water W. The sludge or foreign substances in the air hitting against the cooling water W is mixed with the cooling water W and sinks in the cooling water storage 14.

The cooling water W in the cooling water storage 14 is sterilized and deodorized by the ozone lamps 25, such that the stink or contamination of the cooling water W can be minimized. When a predetermined amount or more of foreign substances or sludge is accumulated in the cooling water storage 14, the sludge discharge valve 16 on the bottom of the case is opened and they are removed.

The cooling water W in the cooling water storage 14 keeps a predetermined level. When the level decreases, the water supply valve 15 is opened and the cooling water can be supplied, and when the level increases over a predetermined level, the cooling water can be discharged outside through the cooling water discharge valve 17b. Accordingly, the cooling water W maintains the predetermine level, so it can effectively come in contact with polluted-air discharged from the spraying portion 130.

The air hitting against the cooling water W flows upward, in which the air hits against and flows around the first vortex plate 210 and the second vortex plate 220. That is, as the air flowing upward hits against the first vortex 210 and the second vortex 220, the remaining sludge and foreign substances can be separated again.

The air flowing upward through the first vortex plate 210 and the second vortex plate 220 passes through the cooling water grill 410 or moves along the wall of the cooling water grill 410. Since a water film is formed on the cooling water grill 410 by the cooling water W sprayed from the second spray nozzle 420, the air passes through or comes in ct with the cooling water grill 41 is additionally cooled and foreign substances can drop with the cooling water W.

The air passing through the cooling water grill 410 moves upward through the filter assembly 300 and fine particles or foreign substances in the air are finally filtered through the filter assembly 300.

The air cooled with foreign substances completely removed through the filter assembly 300 can be discharged to the outside of the collector 10 through the air discharge port 19. When there is the photo-catalytic purifying unit 500 in the air discharge port 19, the air can be additionally sterilized and deodorized through the air discharge port 19.

In detail, the air flowing inside through the inlet 19a of the air discharge port 19 is purified and sterilized through the photo-catalytic purifying unit 500 composed of the photo-catalytic plates 510 and the ultraviolet lamps 520 and then discharged to the outlet 19b of the air discharge port 19. The air holes 511 and the guides 512 are formed on the photo-catalytic plates 510 and the guides 512 extend to cross the guides 512 of the adjacent photo-catalytic plates 510, such that the air can flow in a zigzag pattern. Accordingly, the discharged air can react with the photo-catalyst during time sufficient for a photo-catalytic reaction by the photo-catalytic purifying unit in the air discharge port 19, such that the air can be purified by sterilizing and deodorizing and then discharged.

The polluted-air cooled several times with sludge and foreign substances removed through the collector 10 can be discharged outside with the temperature decreases in a clean state.

An additional purifying system or a specific system for discharging air may be further disposed at the outlet 19b of the collector 10, if necessary.

The wet type dust collector for air purifying according to the present invention may be implemented in another embodiment other than the embodiment described above.

In a wet type dust collector for air purifying according another embodiment of the present invention, the air spray unit is disposed at the lower end of the blower pipe and the structure is a little different from that of the previous embodiment.

The wet type dust collector for air purifying according to another embodiment of the present invention is different only in the configuration of the air spray unit and the air discharge port of the previous embodiment, but other configurations are the same, so the same configurations are given the same reference numerals and the detailed description is not provided.

Figure 8:
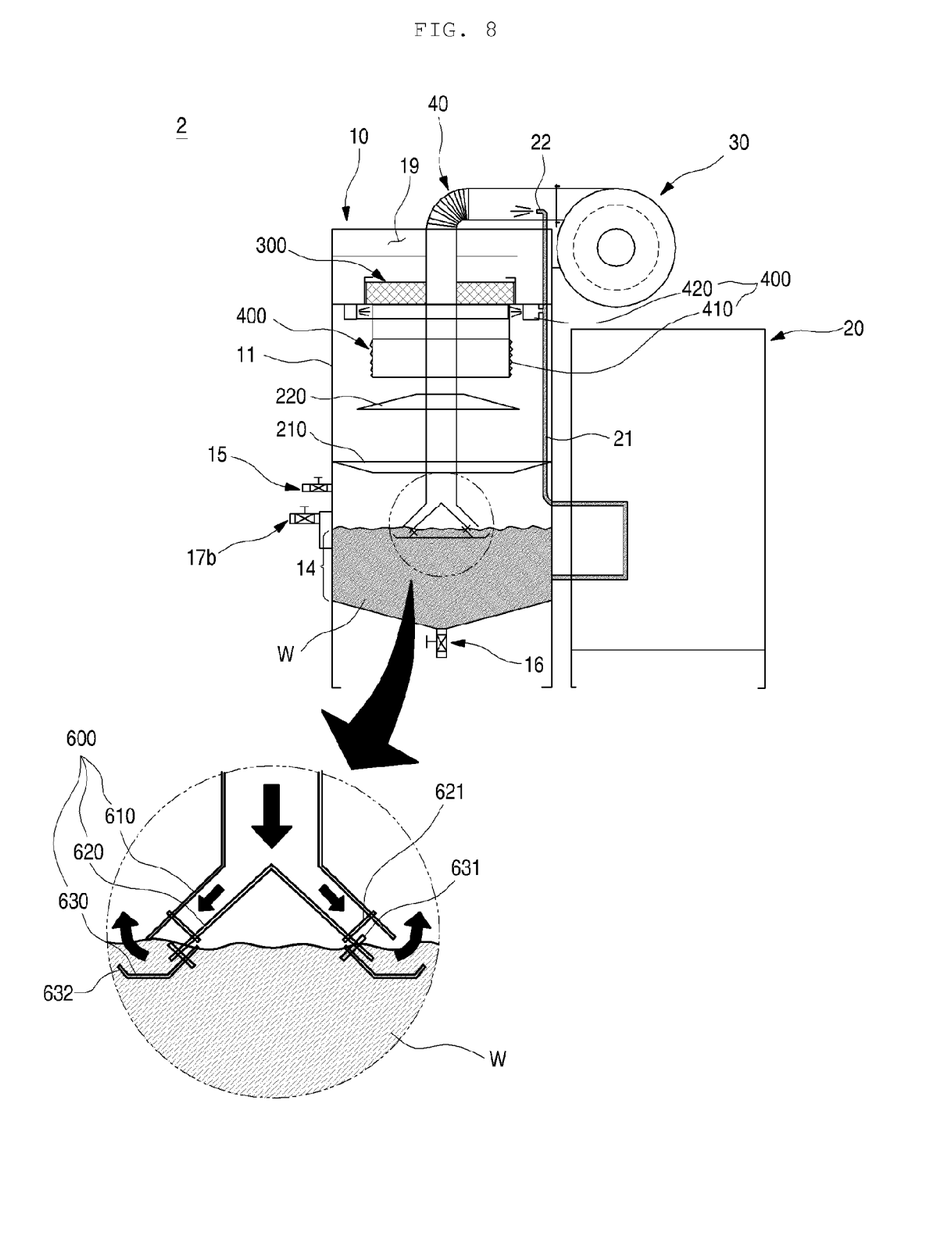
FIG. 8 is a front view illustrating the inside of a wet type dust collector for air purifying according to another embodiment of the present invention.

FIG. 8 is a front view illustrating the inside of a wet type dust collector for air purifying according to another embodiment of the present invention.

Referring to FIG. 8, the wet type dust collector 2 for air purifying according to another embodiment of the present invention includes a collector 10 and a cooler 20.

The outer shape of the collector 10 is formed by the case 11, the blower 30, and the blower pipe 40. A cooling water storage 14 that stores cooling water W may be formed in the collector 10, a sludge discharge valve 16 may be disposed on the bottom of the case 11, and a water supply valve 15 and a cooling water discharge valve 17b may be disposed on a side of the case 11.

The cooling water storage 14 is connected with a cooling pipe 21 passing through the cooler 20 and supplies cooling water W, and a first spray nozzle 22 and a second spray nozzle 420 that spray cooling water W to the blower pipe 40 and a cooling water grill 410 are disposed in the cooling pipe 21.

A first vortex plate 210 and a second vortex plate 220 are disposed in the case 11, such that air flowing upward can hit against and go around the vortex plates. An auxiliary cooling assembly 400 and a filter assembly 300 are disposed over the first vortex plate 210 and the second vortex plate 220. An air discharge port 19 through which air cooled with dust removed is discharged is formed over the filter assembly 300.

This configuration is generally the same as that of the previous embodiment and the detailed description is not provided.

An air spray unit 600 is disposed at the lower end of the blower pipe 40. The air spray unit 600 has bending portions 610 that bend outward at the lower end of the blower pipe 40, guides 620 in the bending portions 610, and bottoms 630 at the lower ends of the guides 620.

In detail, the bending portions 610 bend outward at an angle at the lower end of the blower pipe 40. The bending portions 610 have a rectangular or a circular cross-section, depending on the cross-sectional shape of the blower pipe 40. The bending portions 610 may extend to the surface of the cooling water W in the cooling water storage 14.

The guide 620 is fixed in the bending portions 610 at a predetermined distance from the inner sides of the bending portions 610, such that passages through which the air from the blower pipe 40 flows are formed. The guides 620 may be fixed at a predetermined distance from the bending portions 610 by connecting members 621 and may be formed in the shape of a rectangular or circular cone, corresponding to the cross-sectional shape of the bending portions 610.

The bottoms 630 are formed under the guides 620. The bottoms 630 are positioned under the lower ends of the bending portions 610 and the guides 620 and under the surface of the cooling water W in the cooling water storage 14.

The bottoms 630 are connected to the guides 620 by the connecting members 631 and formed in the shape of a plate parallel to the ground. The outer end 632 of the bottom 630 bends upward so that air discharged between the bending portion 610 and the guide 620 can be dispersed outward under the surface of the cooling water W after hitting against the surface of the cooling water W.

The amount of air to be discharged between the bending portion 610 and the guide 620 can be controlled in accordance with the bending angle of the bending portion 610 and the size of the guide 620.

The polluted-air discharged to the surface of the cooling water W through the air spray unit 600 is guided upward again after cooled again by the cooling water W, goes around the first vortex plate 210 and the second vortex plate 220, is additionally cooled and filtered through the cooling water grill 410 and the filter assembly 300, and is then discharged through the air discharge port 19.

A photo-catalytic purifying unit 500 may be disposed in the air discharge port 19, as described above, or the photo-catalytic purifying unit 500 may not be disposed in the air discharge port 19, but at a side of the collector 10 with a specific channel formed.

The wet type dust collector for air purifying according to the present invention may be implemented in another embodiment other than the embodiments described above.

A wet type dust collector for air purifying according to another embodiment of the present invention is characterized in that a photo-catalytic purifying unit is disposed outside a case and integrally formed with a collector.

The wet type dust collector for air purifying according to another embodiment of the present invention is different only in the configuration of the photo-catalytic purifying unit of the previous embodiments, but other configurations are the same, so the same configurations are given the same reference numerals and the detailed description is not provided.

Figure 9:
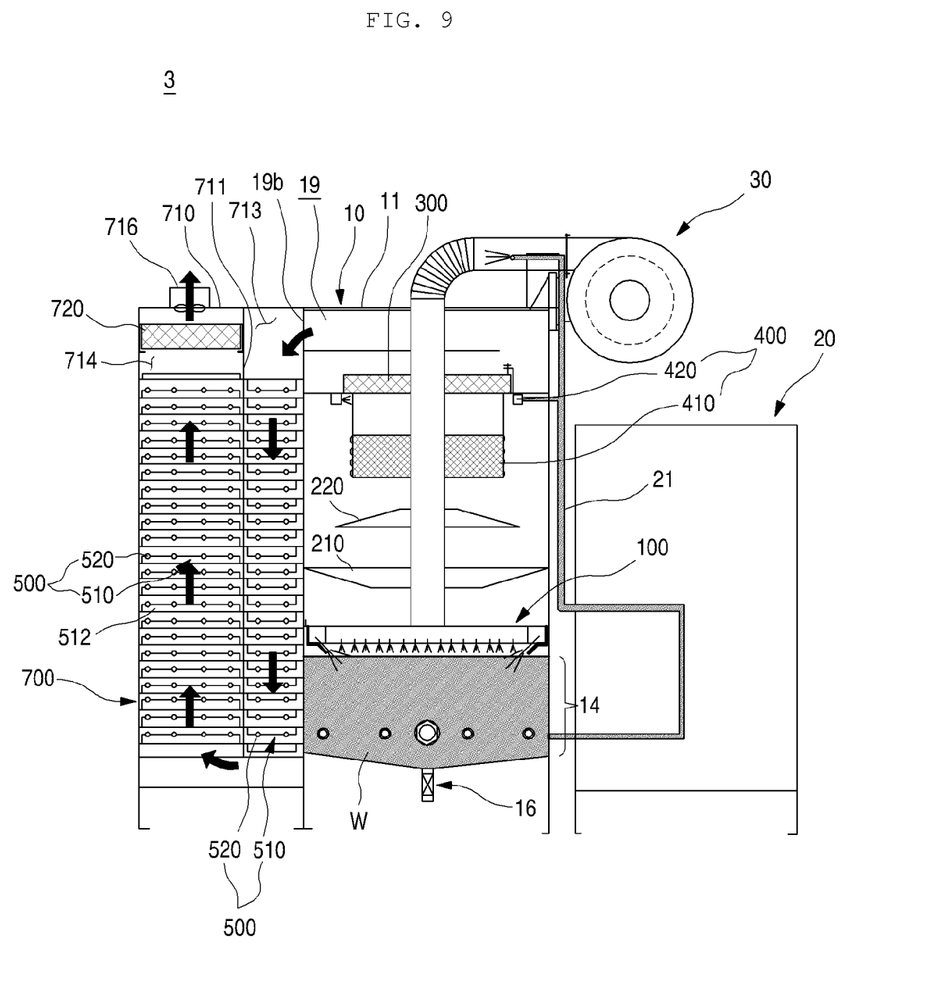
FIG. 9 is a front view illustrating the inside of a wet type dust collector for air purifying according to another embodiment of the present invention.

FIG. 9 is a front view illustrating the inside of a wet type dust collector for air purifying according to another embodiment of the present invention.

Referring to FIG. 9, the wet type dust collector 3 for air purifying according to another embodiment of the present invention includes a collector 10, a cooler 20, and a photo-catalytic purifying unit 500.

The outer shape of the collector 10 is formed by the case 11, the blower 30, and the blower pipe 40. A cooling water storage 14 that stores cooling water W may be formed in the collector 10, a sludge discharge valve 16 may be disposed on the bottom of the case 11, and a water supply valve and a cooling water discharge valve may be disposed on a side of the case 11.

The cooling water storage 14 is connected with a cooling pipe 21 passing through the cooler 20 and supplies cooling water W, and a first spray nozzle 22 and a second spray nozzle 420 that spray cooling water W to the blower pipe 40 and a cooling water grill 410 are disposed in the cooling pipe 21.

An air spray unit 100 that discharges polluted-air to the surface of the cooling water W is disposed at the lower end of the blower pipe 40 in the case 11, and a first vortex plate 210 and a second vortex plate 220 are disposed over the air spray unit 100 so that air moving up can hit against and go around them. An auxiliary cooling assembly 400 and a filter assembly 300 are disposed over the first vortex plate 210 and the second vortex plate 220. An air discharge port 19 through which air cooled with dust removed is discharged is formed over the filter assembly 300.

This configuration is generally the same as that of the previous embodiment and the detailed description is not provided.

An air purifying unit 700 of which the outer shape is formed by a purifying unit case 710 may be further disposed at a side of the case 11 of the collector 10. The purifying unit case 710 has a size and a width corresponding to those of the case 11 and communicates with the outlet 19b of the air discharge port 19.

The purifying unit case 710 provides a space where a plurality of photo-catalytic purifying units 500 can be mounted, and if necessary, it is divided into a plurality of spaces to form channels.

In detail, a separation plate 711 vertically extending and dividing the inside of the purifying unit case 710 to the left and right is provided. The purifying unit case 710 is divided to the left and right into a first reaction chamber 713 and a second reaction chamber 714 by the separation plate 711.

The separation plate 711 extends downward from the internal top of the purifying unit case 710 to a portion spaced from the bottom in the purifying case 11. Accordingly, the air flowing into the purifying unit case 710 through the outlet 19b of the air discharge port 19 flows down along the first reaction chamber 713 and keeps flowing into the second reaction chamber 714 through the passage between the separation plate 711 and the purifying unit case 710, and is then moved upward and discharged.

The photo-catalytic purifying units 500 are disposed in the first reaction chamber 713 and the second reaction chamber 714. The photo-catalytic purifying units 500, similar to the previous embodiments, are each composed of photo-catalytic plates 510 and ultraviolet lamps 520 and are sequentially arranged with regular intervals.

Guide 512 that guides air are bent at an angle toward the flow direction of air, on the photo-catalytic plate 510. The guides 512 of the photo-catalytic purifying units 500 vertically arranged, adjacent to each other, are formed to cross each other such that the air flowing through the photo-catalytic purifying units 500 can flow in a zigzag pattern.

Accordingly, the guides 512 of the photo-catalytic purifying units 500 in the first reaction chamber 713 in which air flows down are bent downward, while the guides 512 of the photo-catalytic purifying units 500 in the second reaction chamber 714 in which air flows up are bent upward.

The first reaction chamber 713 is smaller in width than the second reaction chamber 714. Accordingly, the width of the first reaction chamber 713, where a photo-catalytic reaction starts, using the characteristic that a photo-catalytic reaction is activated with flow of air, is small and the speed of air flow in the second reaction chamber 714 in which a photo-catalytic reaction has been made somewhat. Therefore, a photo-catalytic reaction is more effectively made and air can be sterilized and deodorized.

A filter 720 may be further provided at the upper portion in the second reaction chamber 714 and a purifying unit outlet 716 that is open on the top of the purifying unit case 710 may be provided over the filter 720. A fan or a grill may be further provided in the purifying unit outlet 716.

What is claimed is:

1. A wet type dust collector for air purifying, comprising:
    a case that forms the outer shape of a collector and receives cooling water;
    a cooler that cools cooling water that is guided by a cooling pipe connected with the case;
    a blower that is disposed outside the blower and forcible takes and sends polluted-air inside;
    a blower pipe that is connected with an outlet of the blower and guides the sent polluted-air into the case;
    a spray nozzle that is connected with the cooling pipe, disposed in the blower pipe, and sprays cooling water to the polluted-air flowing in the blower pipe;
    an air spray unit that is connected to the lower end of the blower pipe and distributes the polluted-air discharged through the blower pipe to be discharged in contact with the surface of the cooling water;
    an auxiliary cooling assembly that is disposed over the air spray unit, has a porous structure forming a cooling water film with the cooling water sprayed from the outside, and cools again the polluted-air moving upward;
    a filter assembly that is disposed over the auxiliary cooling assembly and filters foreign substances and sludge in the polluted-air; and
    an air discharge port that is disposed over the case and forms a passage through which the polluted-air passing through the filter assembly is discharged to the outside.

2. The wet type dust collector of claim 1, wherein a plurality of photo-catalytic purifying units is disposed in the air discharge port to sterilize and deodorize the polluted-air, using a photo-catalytic reaction.

3. The wet type dust collector of claim 2, wherein the photo-catalytic purifying units are sequentially arranged with regular intervals and the polluted-air sequentially passes through the photo-catalytic purifying units.

4. The wet type dust collector of claim 2, wherein the photo-catalytic purifying unit includes: photo-catalytic plates formed by coating a copper plate with titanium dioxide and having air holes through which air passes and guides that are bent at an angle at one end of the air holes and guides the air passing through the air holes; and
    ultraviolet lamps disposed on one side of the photo-catalytic plates.

5. The wet type dust collector of claim 1, wherein an air purifying unit including a plurality of photo-catalytic purifying units for sterilizing and deodorizing the polluted-air, using a photo-catalytic reaction, communicates with the air discharge port outside the case.

6. The wet type dust collector of claim 5, wherein the photo-catalytic purifying units are sequentially arranged with regular intervals and the polluted-air sequentially passes through the photo-catalytic purifying units.

7. The wet type dust collector of claim 5, wherein the photo-catalytic purifying unit includes: photo-catalytic plates formed by coating a copper plate with titanium dioxide and having air holes through which air passes and guides that are bent at an angle at one end of the air holes and guides the air passing through the air holes; and
    ultraviolet lamps disposed on one side of the photo-catalytic plates.

8. The wet type dust collector of claim 7, wherein the guides are arranged to cross each other on adjacent photo-catalytic plates so that the flow path of air is elongated, in the photo-catalytic purifying units sequentially arranged.

9. The wet type dust collector of claim 5, wherein the air purifying unit includes,
    a purifying unit case being in contact with the case and a separation plate dividing the inside of the purifying unit case into a plurality of spaces to form channels for polluted-air; and
    a plurality of photo-catalytic purifying units are arranged with regular intervals in the divided spaces.

10. The wet type dust collector of claim 1, wherein a vortex plate that is formed in the shape of an inclined plate and that polluted-air flowing upward hits against and goes around is disposed between the air spray unit and the auxiliary cooling assembly.

11. The wet type dust collector of claim 10, wherein the vortex plate includes a first vortex plate mounted around the inner side of the case and inclined toward the inside and a second vortex plate fitted on the blower pipe over the first vortex plate and inclined outward to cross the first vortex plate.

12. The wet type dust collector of claim 1, wherein the air spray unit has a connecting portion connected with the blower pipe, branches extending laterally from the connecting portion, and a spraying portion communicating with the ends of the branches, formed around the inner side of the case, and having a plurality of outlets at the bottom through which polluted-air is discharged.

13. The wet type dust collector of claim 12, wherein a guide plate that is inclined under the spraying portion and that the polluted-air discharged from the outlets hits against.

14. The wet type dust collector of claim 1, wherein the air spray unit has bending portions extending outward at an angle from the end of the blower pipe, guides disposed in the bending portions at a predetermined distance from the bending portions, and bottoms that are disposed horizontally under the guide and that the polluted-air discharged to the channels formed by the bending portions and the guides hits against.

15. The wet type dust collector of claim 1, wherein a water supply valve that supplies water from the outside of the case and a cooling discharge valve that discharges stored cooling water are disposed in the case so that the cooling water can maintain a predetermined level being in contact with the air spray unit.

16. The wet type dust collector of claim 1, wherein a heater for heating cooling water is disposed under the case and cooling water supplied through the cooling pipe is cooled by a refrigeration cycle of the cooler and maintained at a predetermined temperature.

17. The wet type dust collector of claim 1, wherein ozone lamps that sterilize the cooling water are disposed under the case.

18. The wet type dust collector of claim 1, wherein the bottom of the case receiving the cooling water is inclined and a sludge discharge valve for discharging sludge sinking in the cooling water is disposed at the lower end of the case.

* * * * *